United States Patent [19]

Lloyd et al.

[11] Patent Number: 5,460,475
[45] Date of Patent: Oct. 24, 1995

[54] LONG REACH SHUTTLE FOR STORAGE AND RETRIEVAL MACHINE

[75] Inventors: Kurt M. Lloyd, Pewaukee, Wis.; LaMar A. Jones, Sandy, Utah

[73] Assignee: H. K. Systems, Inc., Milwaukee, Wis.

[21] Appl. No.: 140,677

[22] Filed: Oct. 21, 1993

[51] Int. Cl.[6] .................................................. B65G 1/00
[52] U.S. Cl. ........................ 414/659; 414/749; 414/282; 414/662
[58] Field of Search .................................. 414/749, 282, 414/663, 664, 662, 668, 671, 718, 280, 286, 281, 277, 659, 660, 661; 187/9 R, 9 E; 312/330.1, 334.1, 334.7, 334.12

[56] References Cited

U.S. PATENT DOCUMENTS

| | | | |
|---|---|---|---|
| 3,283,924 | 11/1966 | Chasan | 414/282 |
| 3,549,025 | 12/1970 | Messner | 414/282 |
| 3,556,329 | 1/1971 | Johnston et al. | 414/663 |
| 3,638,575 | 2/1972 | Griner | 104/1 |
| 3,848,754 | 11/1974 | Bryntse | 414/749 |
| 3,934,741 | 1/1976 | Wentz | 414/663 |
| 4,388,033 | 6/1983 | Pipes | 414/282 |
| 4,712,964 | 12/1987 | van Elten et al. | 414/281 |
| 4,722,653 | 2/1988 | Williams et al. | 414/222 |
| 4,756,657 | 7/1988 | Kinney | 414/281 |
| 4,773,807 | 9/1988 | Kroll et al. | 414/282 |
| 4,988,262 | 1/1991 | Gines | 414/749 |
| 5,015,140 | 5/1991 | Kling | 414/282 |
| 5,044,859 | 9/1991 | Sorensen et al. | 414/273 |
| 5,049,023 | 9/1991 | Knyazkin et al. | 414/280 |
| 5,207,555 | 5/1993 | Shirai | 414/664 X |

FOREIGN PATENT DOCUMENTS

| | | |
|---|---|---|
| 0241189 | 10/1987 | European Pat. Off. |
| 0329642 | 8/1989 | European Pat. Off. |
| 1547586 | 10/1968 | France |
| 2630412 | 10/1989 | France |
| 1235560 | 9/1967 | Germany |
| 2002749 | 7/1971 | Germany |
| 2313249 | 6/1974 | Germany |
| 2130186 | 5/1984 | United Kingdom |

*Primary Examiner*—Michael S. Huppert
*Assistant Examiner*—Stephen Gordon

[57] ABSTRACT

A storage and retrieval machine including a multi-reach shuttle including six overlaid plate assemblies supported for extension and retraction relative to each other by intervening sets of rollers. The rollers are arranged to maximize the range of extension of each plate assembly relative to a preceding plate assembly so that fewer plate assemblies are required to achieve a desired reach. Also, the rollers are positioned to provide an increased number of rollers at primary load bearing positions and fewer rollers at secondary load bearing locations.

30 Claims, 8 Drawing Sheets

Fig. 1

LONG REACH SHUTTLE FOR STORAGE AND RETRIEVAL MACHINE

BACKGROUND OF THE INVENTION

1. Field of the Invention

The invention relates generally to automatic storage and retrieval systems, and more particularly to shuttle mechanisms used on storage and retrieval machines.

2. Reference to Prior Art

Automatic storage and retrieval systems are used in material and inventory storage facilities such as warehouses in which objects are to be temporarily stored. A known storage and retrieval system includes storage racks defining storage compartments or locations suited to hold a box, pallet or other object. The storage and retrieval system also includes a storage and retrieval machine that is moveable up and down an aisle between storage racks and that is operable to deposit objects in designated storage locations in the rack on either side of the aisle and to retrieve those objects when desired.

The storage and retrieval machine includes a base supported for horizontal movement along a track extending down the aisle. A mast extends upwardly from the base and supports a carriage for vertical movement relative to the storage racks. The carriage supports an extractor or shuttle mechanism that is horizontally extendable and retractable relative to the storage locations to remove objects from or place objects onto the racks. The storage locations are vertically separated by a distance sufficient to accommodate the shuttle mechanism when it is extended beneath an object to be moved.

Storage and retrieval machines capable of reaching two or three storage locations deep are also known. The shuttle mechanisms used in multi-reach storage and retrieval machines include a number of overlaid plate assemblies supported on rollers for extension in telescoping relation to one another to achieve the desired reach. Because of the number of plate assemblies needed to provide extended reach capabilities, multi-reach shuttles have a greater height than do single-reach shuttles. To accommodate the increased height of the shuttle, storage locations must be enlarged. This reduces the available vertical rack space for storing objects. For that reason, multi-reach shuttles are typically limited to double-reach depth. Further disadvantages associated with multi-reach shuttles include the size, cost and weight of the shuttle mechanisms.

SUMMARY OF THE INVENTION

The invention provides an automatic storage and retrieval system having a storage and retrieval machine with an improved multi-reach shuttle that is lighter, less complex, and shorter in height than are prior art multi-reach shuttles. The improved multi-reach shuttle is configured to provide desired reach capabilities with fewer plate assemblies than are required in prior art shuttles. This is accomplished by positioning the rollers to increase the stroke of each plate assembly and by designing the roller sets supporting each plate assembly to handle increased loads resulting from the increased plate stroke. Additionally, to further reduce shuttle weight, the plate assemblies are designed to provide roller guides that require less material than the guides employed in prior art arrangements.

More particularly, the improved multi-reach shuttle includes overlaid plate assemblies and sets of rollers between the plate assemblies for supporting the plate assemblies for extension and retraction relative to one another. To support the rollers, roller guides having roller supporting surfaces are provided on selected plate assemblies. The rollers subjected to both downward loads and upward loads (such as to counteract moments resulting from the extension or cantilevering of the shuttle) are provided with both upper and lower supporting surfaces. To reduce material and save shuttle weight, those rollers subjected only to one type of load (either upward or downward) are provided with only one supporting surface. In known prior art shuttles the roller guides provide upper and lower supporting surfaces to all rollers.

Each plate assembly is preferably supported by two sets of rollers to permit shuttle extension in opposite directions to access objects on either side of an aisle. Each roller set includes primary load bearing rollers and secondary load bearing rollers spaced from the primary rollers in the direction of shuttle extension and retraction. When a plate assembly is fully extended (i.e., cantilevered) in one direction relative to the preceding plate assembly, the fully-extended plate assembly (and any succeeding plate assemblies) is supported by a single set of rollers. To maximize extension of each plate assembly, the spacing between the primary and secondary rollers in each set is reduced relative to known prior art arrangements. By increasing plate assembly extension, the total number of plate assemblies needed to achieve a desired reach is reduced compared to prior art arrangements having the same reach capabilities. In one embodiment, this permits the use of only six plate assemblies to achieve a triple-deep shuttle stroke, whereas in prior art shuttles having triple-deep capacities seven plate assemblies are required.

When a plate assembly is extended, the primary load supporting rollers in the roller set supporting that plate assembly must support the weight of the extended plate assembly and all succeeding plate assemblies, while the secondary load bearing rollers counteract the moment created by the cantilevering of those succeeding plates assemblies. Shortening roller spacing results in increased loads experienced by both primary and secondary rollers. In known prior art arrangements, increased roller loads (caused by the use of more plates, for example) are accommodated by using larger rollers which also increase the height of the shuttle. In the embodiment illustrated herein, these increased loads on the primary load bearing rollers are instead handled by using dual rollers having smaller diameters than the single large roller employed in the prior art. The smaller diameter dual rollers make it unnecessary to increase the height of the shuttle.

In order to accommodate the dual rollers, or to accommodate primary load bearing rollers that are simply wider than the secondary load bearing rollers (such wider rollers not being shown in the drawings), the invention also provides a roller guide constructed as follows. The roller guide has a generally vertical surface, a generally horizontal, upwardly facing lower support surface extending in one direction from the vertical surface, and a generally horizontal, downwardly facing upper support surface which is opposite the lower support surface and which extends in the same direction from the vertical surface. The upper and lower surfaces have respective widths perpendicular to the axis of extension and retraction of the plate assemblies, and the width of the surface engaged by the primary load bearing rollers is approximately twice the width of the other surface.

Other features and advantages of the invention will

3 become apparent to those skilled in the art upon review of the following detailed description, claims and drawings.

DESCRIPTION OF THE DRAWINGS

FIG. 24 is a right end view of the unextended shuttle mechanism taken generally along line 24—24 in FIG. 14.

Before one embodiment of the invention is explained in detail, it is to be understood that the invention is not limited in its application to the details of the construction and the arrangement of components set forth in the following description or illustrated in the drawings. The invention is capable of other embodiments and of being practiced or being carried out in various ways. Also, it is to be understood that the phraseology and terminology used herein is for the purpose of the description and should not be regarded as limiting.

DESCRIPTION OF THE PREFERRED EMBODIMENT

Figure 1:
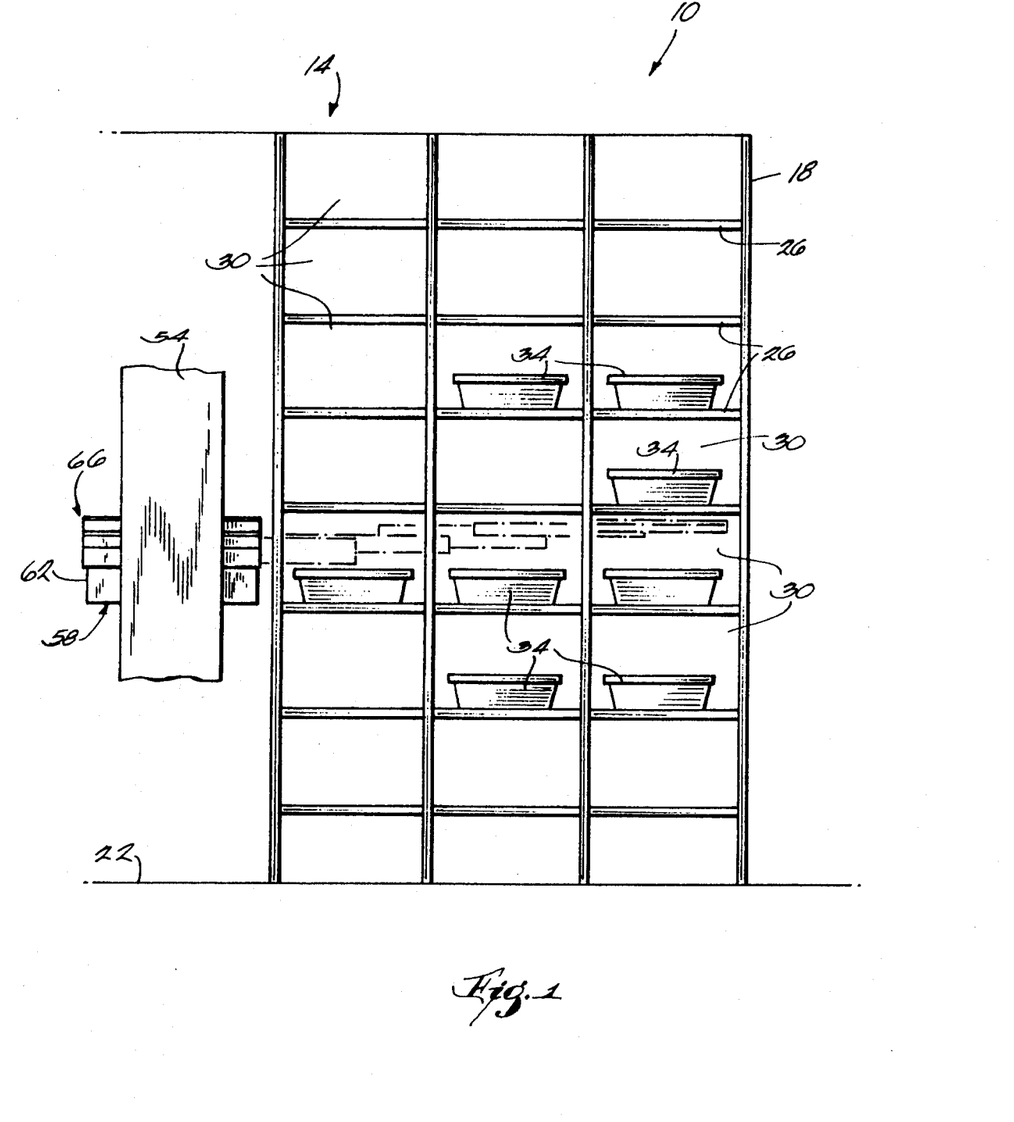
FIG. 1 is an end elevational view of a portion of an automatic storage and retrieval system including a storage and retrieval machine embodying the invention.
Figure 2A:
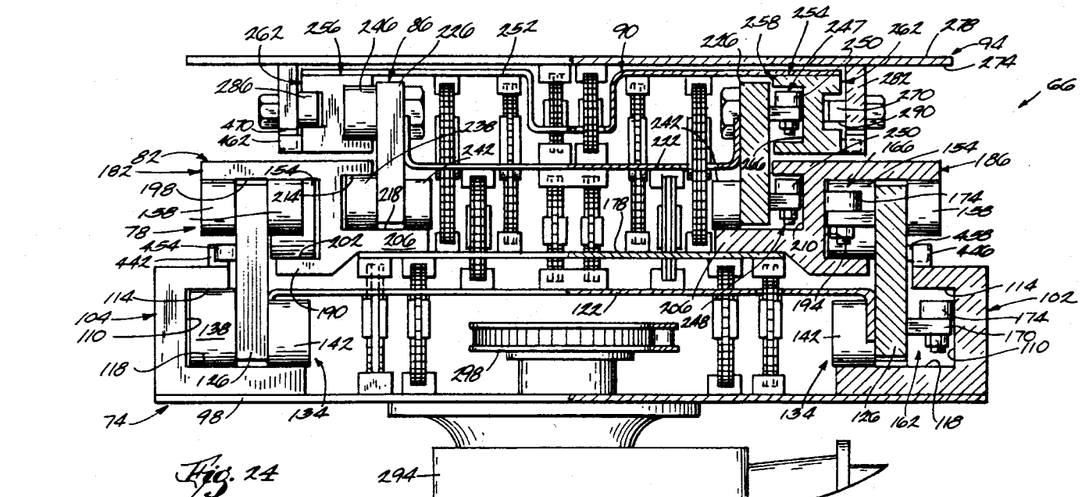
FIG. 2 is a side elevational view of the storage and retrieval machine illustrated in FIG. 1.

Parts of an automatic storage and retrieval system 10 embodying the invention are illustrated in FIGS. 1 and 2. The automatic storage and retrieval system 10 includes (FIG. 1) a storage rack system 14 preferably including racks 18 (only one is shown) on opposite sides of an aisle 22. The rack 18 has shelves 26 or other suitable means defining storage locations 30 for temporarily storing objects 34. In the illustrated arrangement the rack 18 is suitably sized to provide three-deep storage locations.

As shown in FIG. 2, the automatic storage and retrieval system 10 is provided with a lower track or guide rail 38 that is supported on a suitable supporting surface such as the floor and that extends down the aisle 22 (FIG. 1). An upper guide rail 42 is also provided.

The automatic storage and retrieval system 10 also includes a storage and retrieval machine 46 for moving the objects 34 to and from designated storage locations 30 and between the storage rack system 14 and an object entry and exit location (not shown). The storage and retrieval machine 46 comprises a chassis or base 50 supported on the lower guide rail 38 for horizontal rolling or sliding movement, and a pair of masts 54 extending vertically from the base 50. The masts 54 are supported at their upper ends by the upper guide rail 42 to maintain the storage and retrieval machine 46 in an upright position. To position the storage and retrieval machine 46 at desired locations relative to the storage rack system 14, means are provided for moving the base 50 along the lower guide rail 38. Except as described below, the storage and retrieval machine 46 is conventional and will not be described in greater detail. Except as described below, the storage and retrieval machine 46 can be, for example, identical to the storage and retrieval machine disclosed in U.S. Pat. No. 5,279,393 titled AUTOMATIC STORAGE AND RETRIEVAL MACHINE WITH IMPROVED CARRIAGE SIDE GUIDE ROLLER ARRANGEMENT, the specification of which is herein incorporated by reference. It should be understood that while the illustrated storage and retrieval machine 46 is double-masted, the invention is applicable to single-masted storage and retrieval machines.

The storage and retrieval machine 46 also comprises (FIGS. 1 and 2) a carriage 58 which includes a frame 62 and which is supported on the masts 54 for vertical movement relative thereto. The manner of supporting the carriage 58 on the masts 54 and suitable means for moving the carriage 58 vertically with respect to the masts 54 are also disclosed in aforementioned patent application Ser. No. 990,465 and will not be further discussed.

The storage and retrieval machine 46 further comprises a long-reach or multi-reach shuttle mechanism 66 mounted on the carriage frame 62. The shuttle mechanism 66 includes (FIGS. 3 and 24) a plurality of successively positioned plate assemblies that are extendable and retractable relative to one another along a generally horizontal axis 70. While the number of plate assemblies used in the shuttle mechanism 66 is variable depending upon desired reach capabilities, in the illustrated embodiment bottom or first, second, third, fourth, fifth and top or sixth plate assemblies 74, 78, 82, 86, 90, and 94, respectively, are employed. As is more fully explained below, the six plate assemblies provide the shuttle mechanism 66 with the ability to extend into the rack 18 up to three storage locations deep to retrieve or deposit an object 34.

Figure 12:
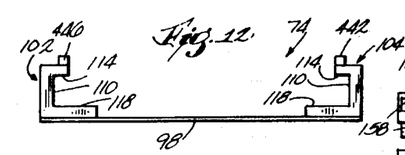
FIG. 12 is a left end view of the first plate assembly.

As shown in FIG. 12, the first plate assembly 74 includes a base plate 98 fixed (see FIG. 2) to the carriage frame 62 and a pair of opposing roller guides 102 and 104 fixed to the opposite sides of the base plate 98. The roller guides 102 and 104 are generally C-shaped and each includes a generally vertical support surface 110, a generally horizontal downwardly facing upper support surface 114, and a generally horizontal upwardly facing lower support surface 118 opposing the upper support surface 114. The upper and lower support surfaces 114, 118 extend laterally (i.e., in a direction perpendicular to the axis 70) inwardly from the vertical support surface 110, and the lower support surface 118 has a lateral width that is preferably at least twice that of the upper support surface 114. The upper support surfaces 114 of the roller guides 102 and 104 are coplanar, and the lower support surfaces 118 of the roller guides 102 and 104 are coplanar.

Figure 13:
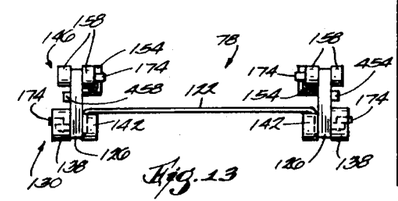
FIG. 13 is a left end view of the second plate assembly.
Figure 14:
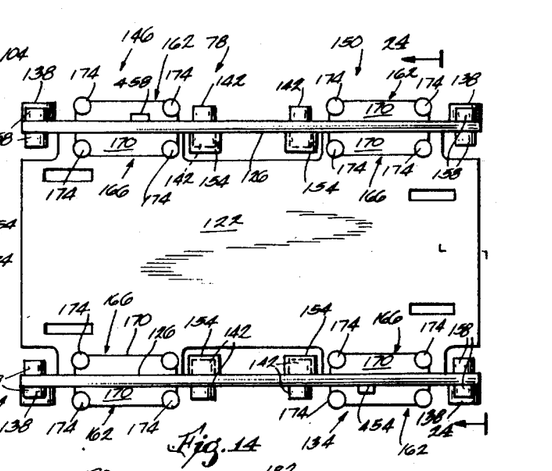
FIG. 14 is a top plan view of the second plate assembly.

As shown in FIGS. 13 and 14, the second plate assembly 78 includes a base plate 122 and a pair of transversely (or vertically) oriented side plate members 126 fixed to the opposite sides of the base plate 122. The second plate assembly 78 also includes a lower tier of rollers which in the illustrated embodiment is arranged into (see FIGS. 3 and 14) opposite lower roller sets 130 and 134 for supporting the second plate assembly 78 for movement (i.e., extension and retraction) in the direction of the axis 70 and relative to the first plate assembly 74. The lower roller sets 130 and 134 are mirror images of each other and each includes (see FIGS. 3, 13 and 14) a pair of outer first rollers 138 that are rotatably mounted in coaxial relation on the outboard sides of the side plate members 126. Each of the rollers 138 is (see FIG. 24) received in one of the roller guides 102 and 104 of the first plate assembly 74. Each of the lower roller sets 130 and 134 also includes (see FIGS. 3, 13 and 14) four inner second rollers 142. The second rollers 142 are rotatably mounted in coaxial relation on opposite sides of the side plate members 126 and are spaced horizontally inwardly (i.e., along the axis 70) from the first rollers 138. As shown most clearly in FIG. 24, the second rollers 142 are smaller in diameter than the first rollers 138 and each of the second rollers 142 is supported for rolling movement along the lower support surface 118 of one of the roller guides 102 and 104.

Figure 3:
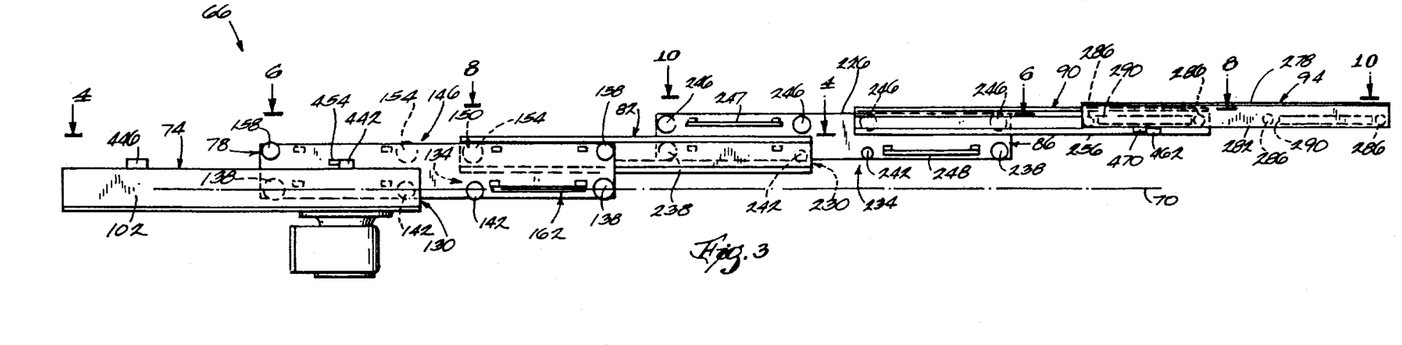
FIG. 3 is a side elevational view of the shuttle mechanism showing the shuttle mechanism fully extended.

As shown in FIG. 3, the second plate assembly 78 is also provided with an upper tier of rollers arranged in opposite upper roller sets 146 and 150 for supporting the third plate assembly 82 for extension and retraction in the direction of the axis 70. The upper roller sets 146 and 150 are mirror images of each other and each includes (FIGS. 3, 13 and 14) a pair of inner third rollers 154. The third rollers 154 are rotatably mounted in coaxial relation on the inboard sides of the side plate members 126 and are positioned above the second rollers 142. The third rollers 154 are preferably identical to the first rollers 138.

Each of the upper roller sets 146 and 150 also includes (see FIGS. 3, 13 and 14) four outer fourth rollers 158 rotatably mounted in coaxial relation on opposite sides of the side plate members 126. The fourth rollers 158 in each of the upper roller sets 146 and 150 are spaced horizontally outwardly (i.e., along the axis 70) from the third rollers 154 in that set and are positioned above the first rollers 138. The fourth rollers 158 are preferably smaller in diameter (see FIG. 24) than the second rollers 142.

The second plate assembly 78 is also provided with means for stabilizing the first, second and third plate assemblies 74, 78 and 82 relative to one another and for removing horizontal play between those plate assemblies. This is intended to assist the smooth extension and retraction of the second plate assembly 78 relative to the first plate assembly 74 and the third plate assembly 82 relative to the second plate assembly 78. While various stabilizing means can be employed, in the illustrated arrangement (FIG. 14) two lower stabilizer assemblies 162 are mounted on the outboard side of each of the side plates 126 and two upper stabilizer assemblies 166 are mounted on the inboard side of each of the side plate members 126. The lower and upper stabilizer assemblies 162 and 166 each include a mounting bracket 170 that supports a pair of horizontally oriented (i.e., oriented for rotation about a vertical axis) rollers 174. The rollers 174 of the lower stabilizer assemblies 162 roll along (FIG. 24) the vertical support surfaces 110 of the roller guides 102 and 104, and the rollers 174 of the upper stabilizer assemblies 166 are engageable with the third plate assembly 82 as explained below.

Figure 15:
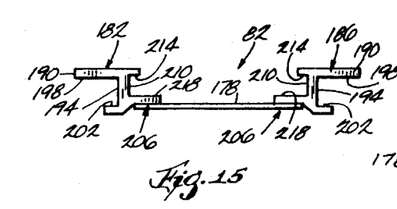
FIG. 15 is a left end view of the third plate assembly.
Figure 16:
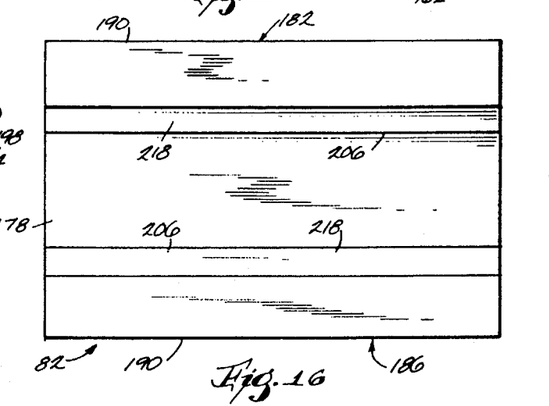
FIG. 16 is a top plan view of the third plate assembly.

As shown in FIGS. 15 and 16, the third plate assembly 82 includes a base plate 178 fixed between a pair of spaced apart, generally H-shaped members 182 and 186. The H-shaped members 182 and 186 define (see FIG. 15) outer roller guides 190 that receive (FIG. 24) the third rollers 154 and the inboard fourth rollers 158. Each outer roller guide 190 includes (see FIG. 15) a generally vertical support surface 194 along which (FIG. 24) the stabilizer rollers 174 of the upper stabilizer assemblies 166 roll, a generally horizontal downwardly facing upper support surface 198 along which the third and fourth rollers 154 and 158 of one side of the second plate assembly 78 roll, and a generally horizontal upwardly facing lower support surface 202. The upper and lower support surfaces 198 and 202 each extend laterally outwardly from the vertical support surface 194. The upper support surfaces 198 are coplanar and the lower support surfaces 202 are coplanar.

Each of the H-shaped members 182 and 186 also defines (see FIG. 15) an inner roller guide 206 having a generally vertical support surface 210, a generally horizontal downwardly facing upper support surface 214, and a generally horizontal upwardly facing lower support surface 218. The upper and lower support surfaces 214 and 218 extend in the laterally inward direction from the vertical support surface 210. The upper support surfaces 214 are coplanar and the lower support surfaces 218 are coplanar.

Figure 17:
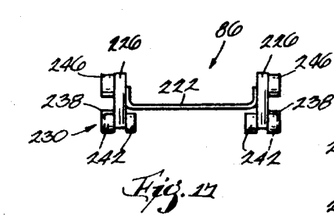
FIG. 17 is a left end view of the fourth plate assembly.
Figure 18:
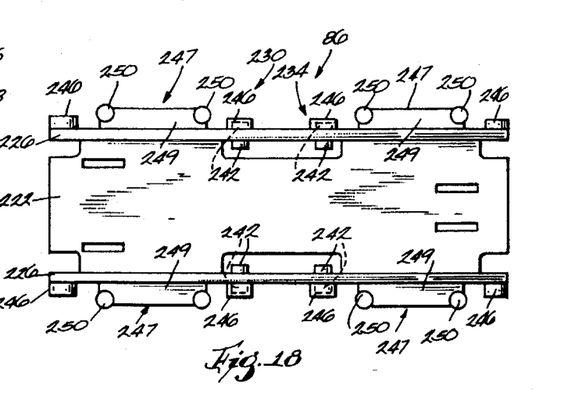
FIG. 18 is a top plan view of the fourth plate assembly.

As shown in FIGS. 17 and 18, the fourth plate assembly 86 includes a base plate 222 and a pair of vertically oriented side plate members 226 fixed to the opposite sides of the base plate 222. The fourth plate assembly 86 also includes a lower tier of rollers arranged to form (see FIG. 3) opposite lower roller sets 230 and 234 for supporting the fourth plate assembly 86 for extension and retraction in the direction of the axis 70 and relative to the third plate assembly 82. The roller sets 230 and 234 are mirror images of each other and each includes (see FIGS. 3, 17 and 18) a pair of outer fifth rollers 238. The fifth rollers 238 in each of the lower roller sets 230 and 234 are rotatably mounted in coaxial relation on the outboard sides of the side plate members 226. As best shown in FIG. 24, the fifth rollers 238 are preferably the same size as the fourth rollers 158 and are each received in one of the inner roller guides 206 of the third plate assembly 82. Each of the lower roller sets 230 and 234 also includes (FIGS. 17 and 18) four inner sixth rollers 242. The sixth rollers 242 in each of the lower roller sets 230 and 234 are rotatably mounted in coaxial relation on opposite sides of the side plate members 226 and are spaced horizontally inwardly from the fifth rollers 238. The sixth rollers 242 (FIG. 24) are smaller in diameter than the fifth rollers 238 and each is supported for rolling movement along one of the lower support surfaces 218 of the inner roller guides 206.

The fourth plate assembly 86 is also provided with an upper tier of rollers including (FIGS. 3, 17 and 18) eight seventh rollers 246 arranged in four coaxial rows (FIGS. 3 and 18) for supporting the fifth plate assembly 90 for extension and retraction relative to the fourth plate assembly 86. The seventh rollers 246 are rotatably mounted on the outboard sides of the side plate members 226 and are the same size as the fifth rollers 238.

Means are also provided on the fourth plate assembly 86 for stabilizing the third, fourth and fifth assemblies 82, 86 and 90 relative to one another. In the illustrated arrangement the stabilizing means includes (see FIGS. 18 and 24) two upper stabilizer assemblies 247 mounted on the outboard side of each of the side plate members 226 and (see FIG. 24) two lower stabilizer assemblies 248 mounted on the outboard side of each of the side plate members 226 and beneath the assemblies 247. The stabilizer assemblies 247 and 248 each include a mounting plate 249 and horizontally oriented rollers 250. The rollers 250 of the lower stabilizer assemblies 248 roll along (FIG. 24) the vertical support surfaces 210 of the inner roller guides 206 of the third plate assembly 82. The rollers 250 of the upper stabilizer assemblies 247 roll along the fifth plate assembly 90 as explained below.

Figure 19:
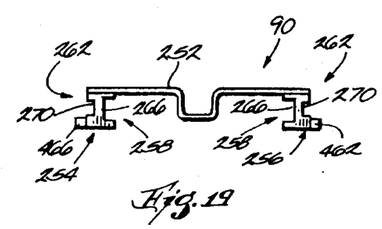
FIG. 19 is a left end view of the fifth plate assembly.
Figure 20:
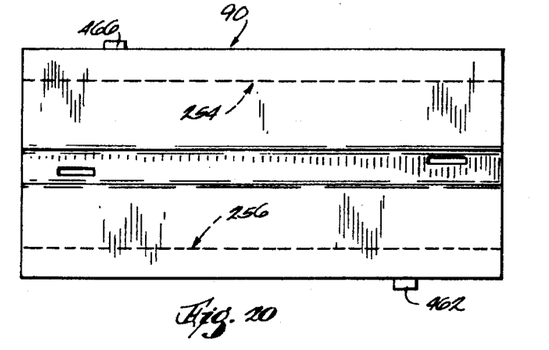
FIG. 20 is a top plan view of the fifth plate assembly.

As shown in FIGS. 19 and 20, the fifth plate assembly 90 includes a base plate 252 and a pair of downwardly extending generally H-shaped members 254 fixed to the opposite sides of the base plate 252. The H-shaped members 254 each define inner and outer roller guides 258 and 262 that include vertical support surfaces 266 and 270, respectively. Each inner roller guide 258 is sized to receive (see FIG. 24) the seventh rollers 246 on one side of the fourth plate assembly 86, and the rollers 250 of the upper stabilizer assemblies 247 on the fourth plate assembly 86 roll along (see FIG. 24) the vertical support surfaces 266 of the inner roller guides 258.

Figure 21:
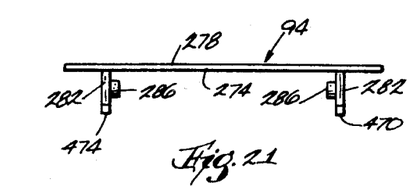
FIG. 21 is a left end view of the sixth plate assembly.
Figure 22:
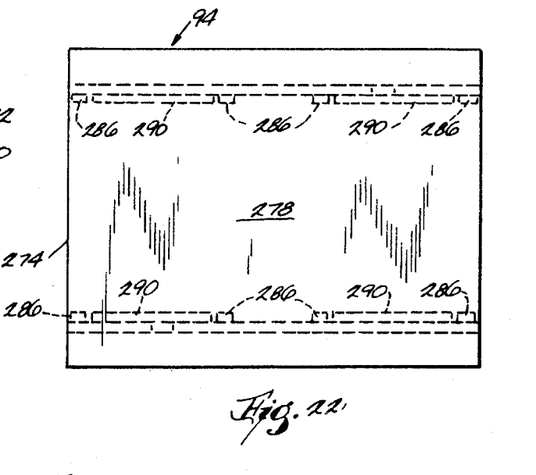
FIG. 22 is a top plan view of the sixth plate assembly.

As shown in FIGS. 21 and 22, the sixth plate assembly 94 includes a support plate 274 having an upper surface 278 for supporting an object 34. The sixth plate assembly 94 also includes a pair of spaced apart plate members 282 extending downwardly from the underside of the support plate 274. To support the sixth plate assembly 94 for extension and retraction relative to the fifth plate assembly 90, the sixth plate assembly 94 is provided with eight rollers 286 rotatably mounted on the inboard sides of the plate members 282. The eighth rollers 286 are received in (see FIG. 24) the outer roller guides 262 of the fifth plate assembly 90. The sixth plate assembly 94 also includes (see FIGS. 22 and 24) two pairs of linear slides 290 fixed to the inboard sides of side plate members 282 for engagement with (see FIG. 24) the vertical support surfaces 270 of the outer roller guides 262.

Figure 4:
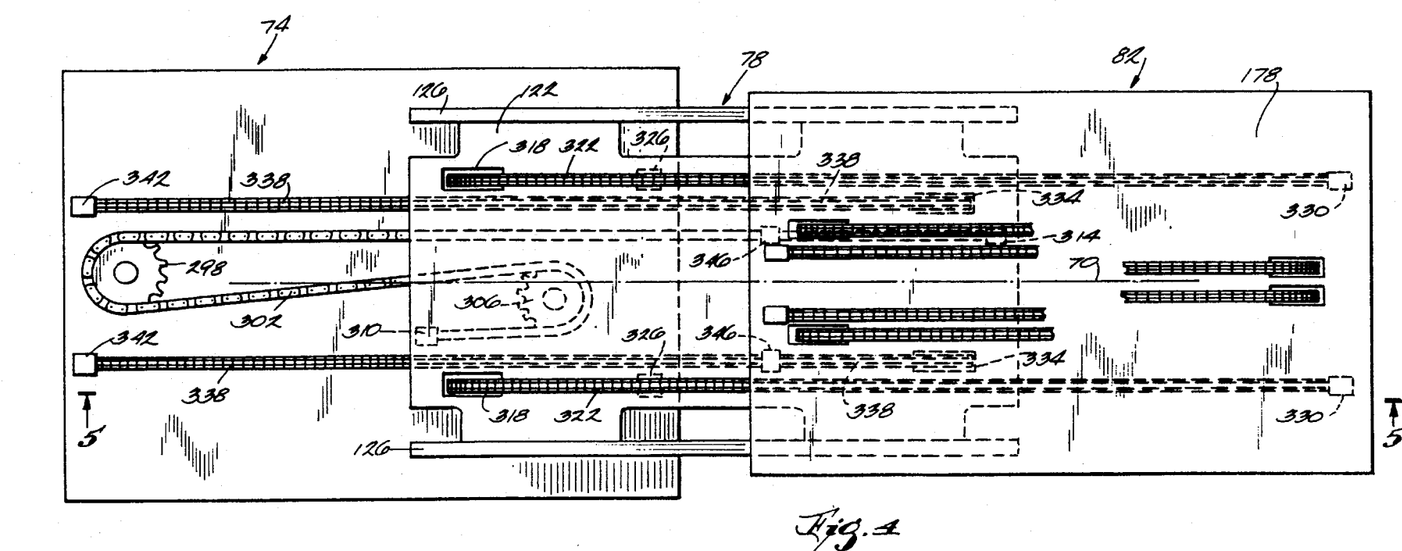
FIG. 4 is an enlarged view taken along line 4—4 in FIG. 3, with certain elements omitted for clarification, showing the lower or first plate assembly, the second plate assembly, and the third plate assembly of the shuttle mechanism.

The shuttle mechanism 66 also includes means for extending and retracting the shuttle mechanism 66. While various means can be employed, in the illustrated arrangement such means includes a drive mechanism including a motor 294 (FIG. 24) mounted on the base plate 98. The motor 294 is reversible and drives a sprocket 298 (FIG. 4) that is mounted on the first plate assembly 74 for rotation about a vertical axis. The drive mechanism also includes a drive chain 302 and an idler sprocket 306 mounted on the first plate assembly 74 for rotation about a vertical axis. The drive chain 302 passes around the driven and idler sprockets 298 and 306 and has (FIG. 4) opposite ends 310 and 314 fixed to the underside of the second plate assembly 78 adjacent the left and right ends thereof, respectively. As is apparent from FIG. 4, clockwise rotation of the driven sprocket 298 pulls the second plate assembly 78 to the right relative to the first plate assembly 74, and counterclockwise rotation of the driven sprocket 298 pulls the second plate assembly 78 to the left relative to the first plate assembly 74.

To move the third, fourth, fifth and sixth plate assemblies 82, 86, 90 and 94 relative to preceding plate assemblies, associated linkage arrangements are provided. In particular, the linkage arrangement associated with the third plate assembly 82 includes (see FIGS. 4 and 5) a pair of vertically oriented sprockets 318 mounted on the second plate assembly 78. The linkage arrangement also includes a pair of chains 322. Each chain 322 passes around one of the sprockets 318 and has opposite ends 326 and 330 fixed adjacent the right ends of the first plate assembly 74 and the third plate assembly 82, respectively. A second pair of vertically oriented sprockets 334 also mounted on the second plate assembly 78 and a second pair of chains 338 are also provided. Each chain 338 passes around one of the sprockets 334 and has opposite ends 342 and 346 fixed adjacent the left ends of the first plate assembly 74 and the third plate assembly 82, respectively.

Figure 5:
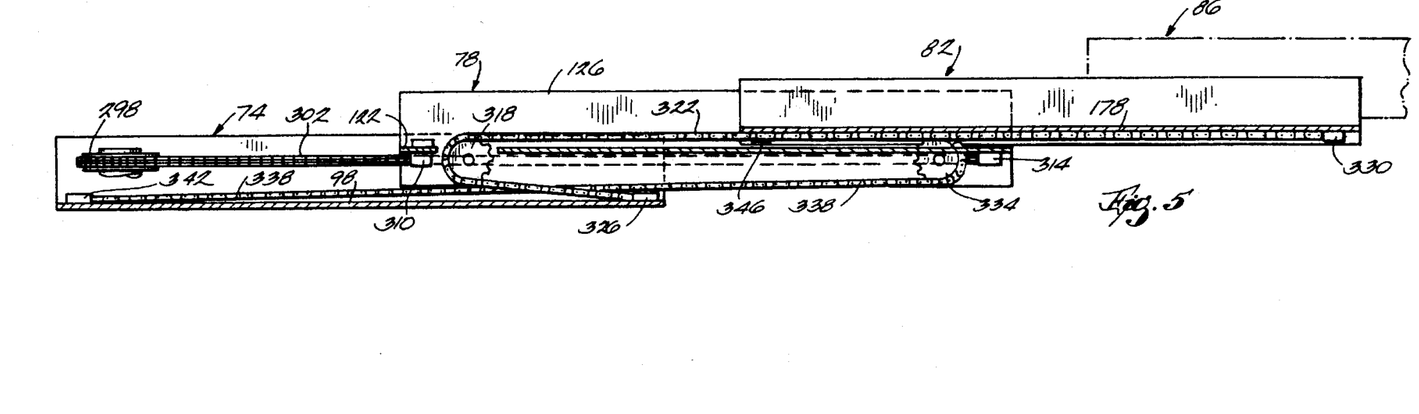
FIG. 5 is a view taken along line 5—5 in FIG. 4, with certain elements omitted for clarification.

As is apparent from FIG. 5, movement of the second plate assembly 78 to the right relative to the first plate assembly 74 causes movement of the sprockets 334 to the right, which in turn causes the chains 338 to pull the third plate assembly 82 to the right relative to the second plate assembly 78. Similarly, movement of the second plate assembly 78 to the left relative to the first plate assembly 74 results in movement of the sprockets 318 to the left which cause the chains 322 to pull the third plate assembly 82 to the left.

Figure 6:
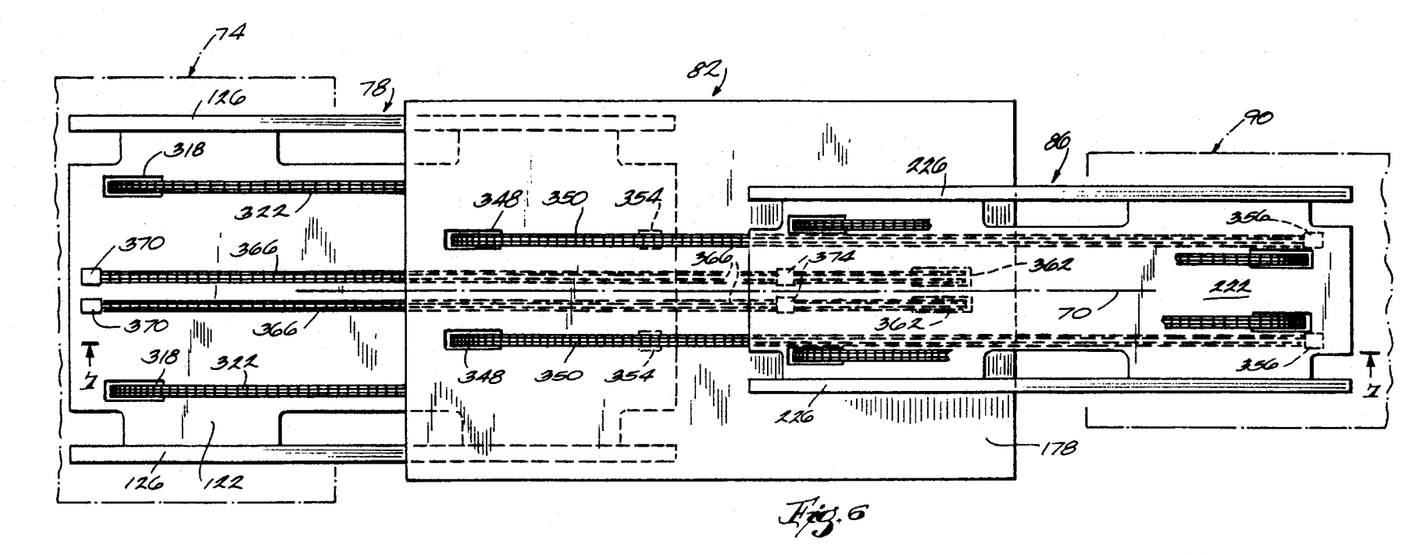
FIG. 6 is an enlarged view taken along line 6—6 in FIG. 3, with certain elements omitted for clarification, showing the second plate assembly, the third plate assembly, and the fourth plate assembly of the shuttle mechanism.

The linkage arrangement associated with the fourth plate assembly 86 includes (FIGS. 6 and 7) a pair of vertically oriented sprockets 348 mounted on the third plate assembly 82. The linkage arrangement also includes a pair of chains 350. Each chain 350 passes around one of the sprockets 348 and has opposite ends 354 and 356 fixed adjacent the right ends of the second plate assembly 78 and the fourth plate assembly 86, respectively. A second pair of vertically oriented sprockets 362 also mounted on the third plate assembly 82 and a second pair of chains 366 are also provided. Each chain 366 passes around one of the sprockets 362 and has opposite ends 370 and 374 fixed adjacent the left ends of the second plate assembly 78 and the fourth plate assembly 86, respectively.

Figure 7:
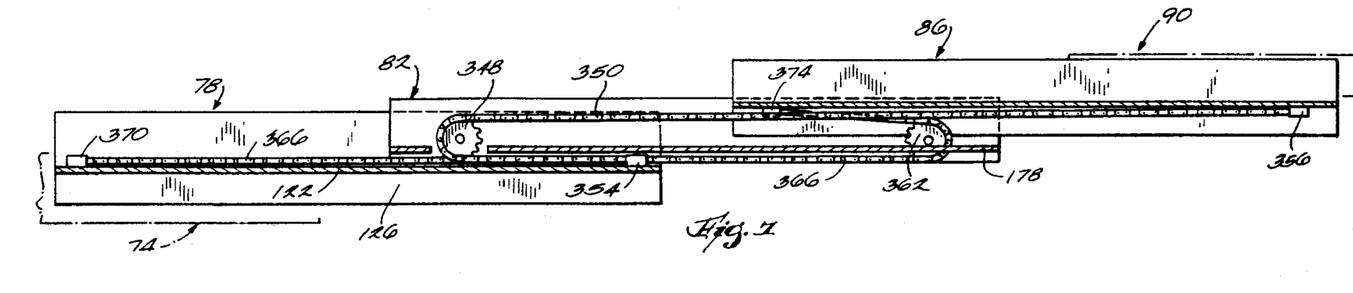
FIG. 7 is a view taken along line 7—7 in FIG. 6, with certain elements omitted for clarification.

As is apparent from FIG. 7, movement of the third plate assembly 82 to the right relative to the second plate assembly 78 also results in movement of the sprockets 362 to the right, which in turn causes the chains 366 to pull the fourth plate assembly 86 to the right relative to the third plate assembly 82. When the third plate assembly 82 is moved to the left relative to the second plate assembly 78, concomitant movement of the sprockets 348 causes the chains 350 to pull the fourth plate assembly 86 to the left.

The linkage arrangement associated with the fifth plate assembly 90 includes (FIGS. 8 and 9) a pair of vertically oriented sprockets 378 mounted on the fourth plate assembly 86. The linkage arrangement also includes a pair of chains 382. Each chain 382 passes around one of the sprockets 378 and has opposite ends 386 and 390 fixed adjacent the right ends of the third plate assembly 82 and the fifth plate assembly 90, respectively. A second pair of vertically oriented sprockets 394 also mounted on the fourth plate assembly 86 and a second pair of chains 398 are also provided. Each chain 398 passes around one of the sprockets 394 and has opposite ends 402 and 406 fixed adjacent the left ends of the third plate assembly 82 and the fifth plate assembly 90, respectively.

Figures 8, 9:
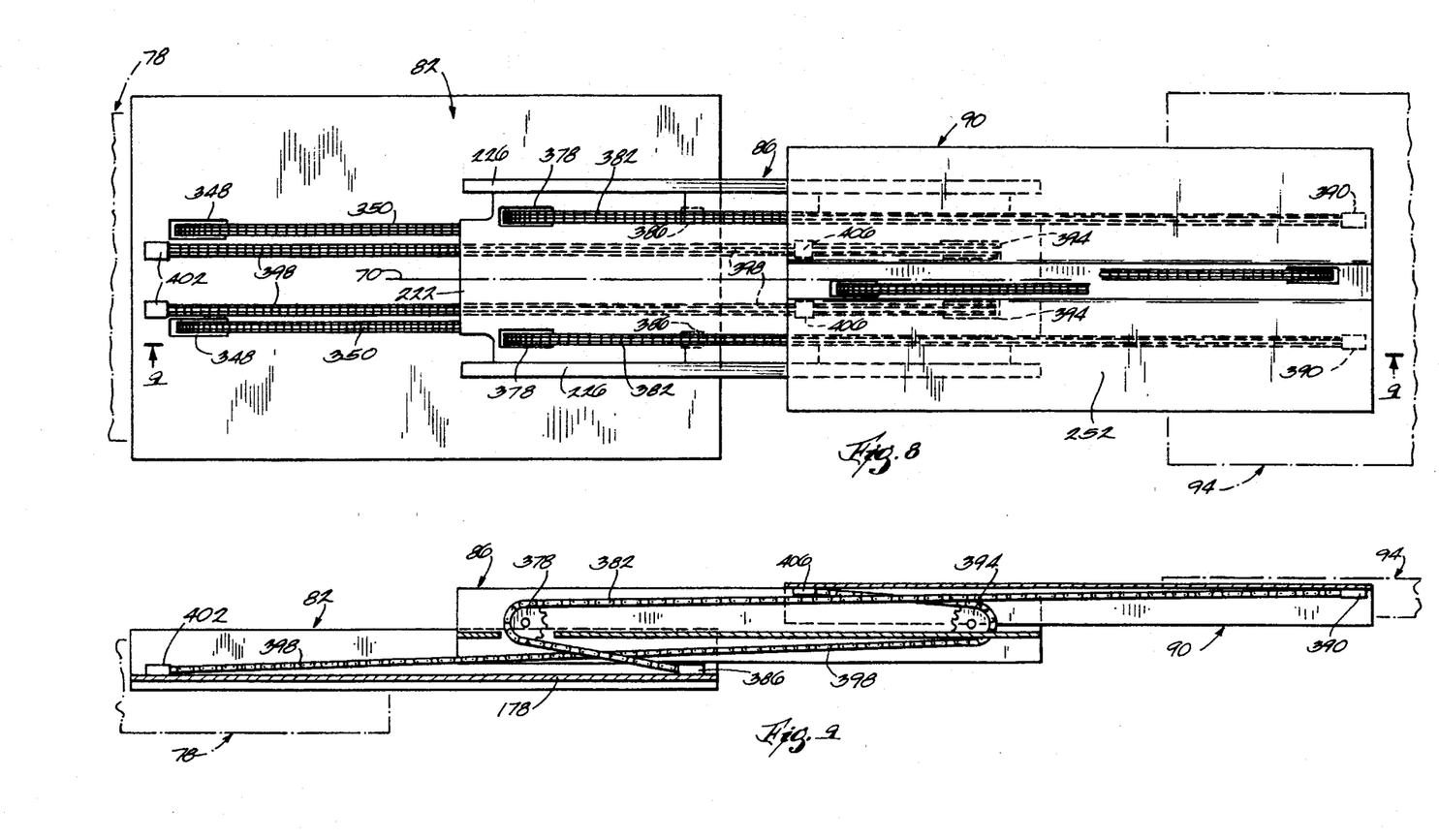
FIG. 8 is an enlarged view taken along line 8—8 in FIG. 3, with certain elements omitted for clarification, showing the third plate assembly, the fourth plate assembly, and the fifth plate assembly of the shuttle mechanism.
FIG. 9 is a view taken along line 9—9 in FIG. 8, with certain elements omitted for clarification.

As is apparent from FIG. 9, movement of the fourth plate assembly 86 to the right relative to the third plate assembly 82 also results in movement of the sprockets 394 to the right, which in turn causes the chains 398 to pull the fifth plate assembly 90 to the right relative to the fourth plate assembly 86. When the fourth plate assembly 86 is moved to the left relative to the third plate assembly 82, concomitant movement of the sprockets 378 causes the chains 382 to pull the fifth plate assembly 90 to the left.

The linkage arrangement associated with the sixth plate assembly 94 includes (FIGS. 10 and 11) a vertically oriented sprocket 410 mounted on the fifth plate assembly 90. The linkage arrangement also includes a chain 414. The chain 414 passes around the sprocket 410 and has opposite ends 418 and 422 fixed adjacent the right ends of the fourth plate assembly 86 and the sixth plate assembly 94, respectively. A second vertically oriented sprocket 426 also mounted on the fifth plate assembly 90 and a second chain 430 are also provided. The chain 430 passes around the sprocket 426 and has opposite ends 434 and 438 fixed adjacent the left ends of the fourth plate assembly 86 and the sixth plate assembly 94, respectively.

Figures 10, 11:
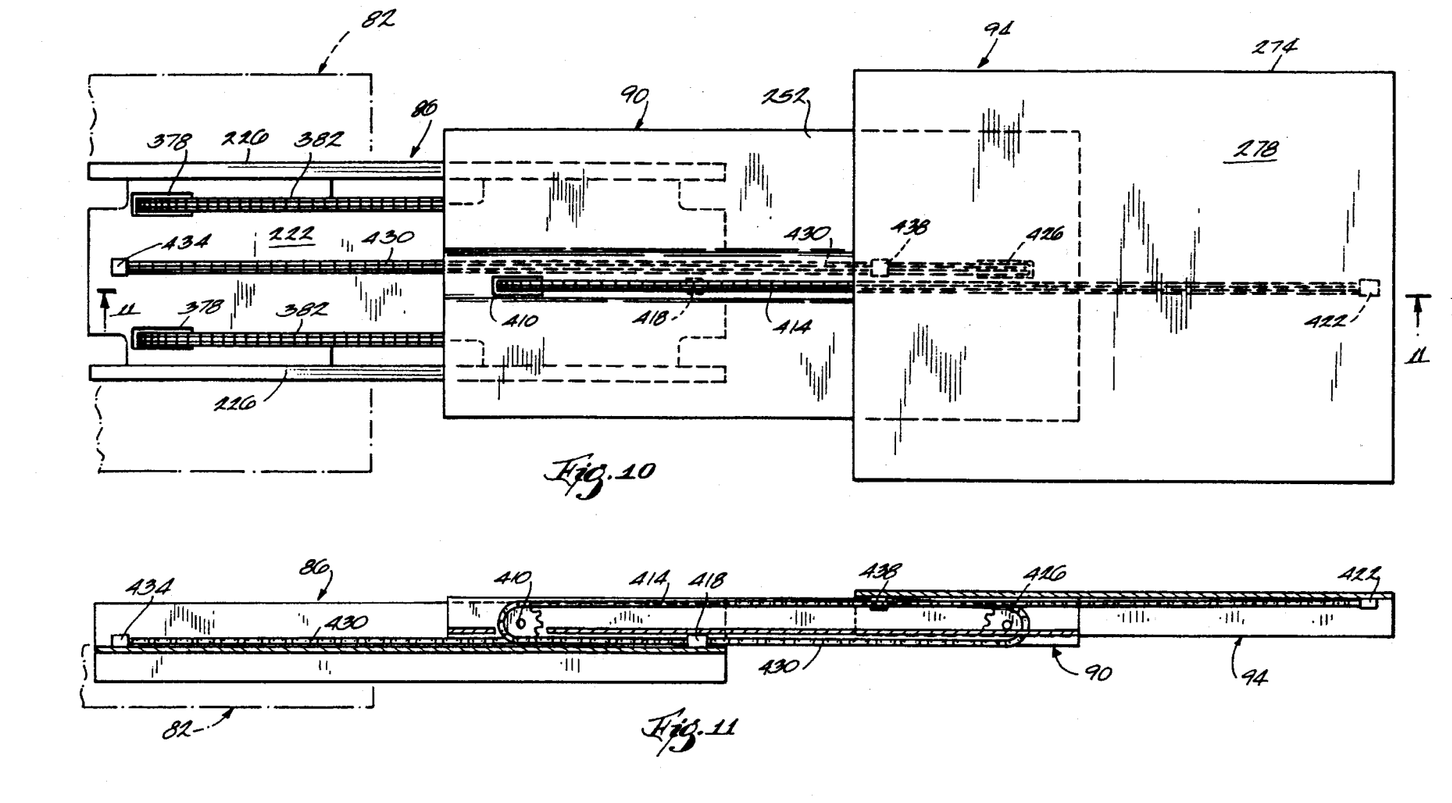
FIG. 10 is an enlarged view taken along line 10—10 in FIG. 3, with certain elements omitted for clarification, showing the fourth plate assembly, the fifth plate assembly, and the sixth plate assembly of the shuttle mechanism.
FIG. 11 is a view taken along line 11—11 in FIG. 10, with certain elements omitted for clarification.

As is apparent from FIG. 11, movement of the fifth plate assembly 90 to the right relative to the fourth plate assembly 86 causes movement of sprocket 426 to the right which in turn causes chain 430 to pull the sixth plate assembly 94 to the right. When the fifth plate assembly 90 is moved to the left relative to the fourth plate assembly 86, concomitant movement of the sprocket 410 causes the chain 414 to pull the sixth plate assembly 94 to the left.

Figure 23:
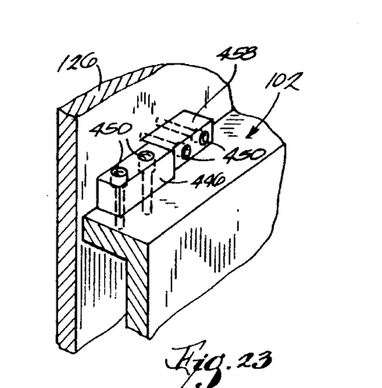
FIG. 23 is an enlarged, partial, perspective view of the shuttle mechanism showing stops on the first and second plate assemblies.

To prevent overextension of any of the plate assemblies 78, 82, 86, 90 and 94 relative to the preceding plate assembly, the shuttle mechanism 66 is provided with means for limiting its stroke length (i.e., to a triple-deep storage location depth) in both directions. In the illustrated arrangement the stroke length limiting means includes (FIGS. 3, 12 and 24) a pair of stops 442 and 446 which are mounted on the roller guides 104 and 102, respectively, of the first plate assembly 74 by screws 450 (FIG. 23) and which are staggered in the direction of the axis 70. Corresponding staggered stops 454 and 458 (FIGS. 3, 14, 15 and 24) are provided on the outboard sides of the side plates 126 of the second plate assembly 78. The means for limiting the stroke of the shuttle mechanism 66 also includes (FIGS. 19 and 20) staggered stops 462 and 466 mounted on the H-shaped members 256 and 254 of the fifth plate assembly 90 and corresponding staggered stops 470 and 474 (FIG. 21) mounted on the plate members 282 of the sixth plate assembly 94.

To operate the shuttle mechanism 66 the motor 294 is used to drive the sprocket 298 in a selected one of the clockwise and counterclockwise directions to drive the shuttle mechanism 66 between full rightward extension (shown in broken lines in FIG. 1), a retracted position (shown in solid lines in FIG. 1), and full leftward extension (not shown). For example, to fully extend the shuttle mechanism 66 to the right from an initially retracted position the sprocket 298 is driven in the clockwise direction to pull the second plate assembly 78 to the right. Rightward movement of the second plate assembly initiates rightward movement of the third, fourth, fifth and sixth plate assemblies 82, 86, 90, and 94, as described above, and the linkage arrangements between the plate assemblies are set so that movement is simultaneous. This movement continues until full rightward extension, which is just prior to engagement of the stops 442 and 462 with the stops 454 and 470, respectively, is reached. As is apparent from FIG. 3 as the second plate assembly 78 approaches the limit of its of rightward range of movement the lower roller set 134 (i.e., the rightmost lower roller set) begins departure from the roller guides 102 and 104. As extension continues the first rollers 138 in the lower roller set 130 (i.e., the leftmost lower roller set) switch from bearing against the lower support surfaces 118 (see FIG. 24) to bearing against the upper support surfaces 114 of the roller guides 102 and 104. While rolling along the upper support surfaces 114, the first rollers 138 in the lower roller set 130 are able to counteract moments exerted on the second plate assembly 78. When the second plate assembly 78 is fully extended to the right, the second rollers 142 in the lower roller set 130 support the entire downward load presented by the cantilevered second plate assembly 78, the succeeding plate assemblies, and an object (if any), and the first rollers 138 in the lower roller set 130 counteract the moment presented by that load by bearing against the upper support surfaces 114 of the roller guides 102 and 104.

Extension of the third, fourth, fifth and sixth plate assemblies 82, 86, 90 and 94 is similar to that of the second plate assembly 78. Regarding the third plate assembly 82, as it approaches the limit of its of rightward range of movement (see FIG. 3) the upper roller set 146 (i.e., the leftmost upper roller set) begins departure from the outer roller guides 190 and the third rollers 154 of the upper roller set 150 (i.e., the rightmost upper roller set) switch from bearing against the upper support surface 198 of the roller guides 190 to bearing against the lower support surfaces 202 of the roller guides 190. When fully extended to the right, the third plate assembly 82 is supported only by the upper roller set 150 with the fourth rollers 154 thereof and the third rollers 158 thereof respectively supporting downward loads and moments exerted on the third plate assembly 82.

As the fourth plate assembly 86 approaches the limit of its of rightward range of movement the lower roller set 234 begins departure from the inner roller guide 206 of the third plate assembly 82 and the fifth rollers 238 of the roller set 230 begin bearing against (see FIG. 24) the upper support surfaces 214 of the inner roller guides 190. When fully extended to the right, the fourth plate assembly 86 is supported only by the roller set 230 with the sixth rollers 242 thereof and the fifth rollers 238 thereof respectively supporting downward loads and moments exerted on the fourth plate assembly 86.

The seventh rollers 246 on the fourth plate assembly 86 and the eighth rollers 286 on the sixth plate assembly 94 respectively support the fifth and sixth plate assemblies 90 and 94 in a manner known in the art.

To extend the shuttle mechanism 66 to the left, the drive motor 294 is operated to drive the sprocket 298 in the counterclockwise direction to reverse the above operation. Full leftward extension is just prior to engagement of the stops 446 and 466 with stops 458 and 474, respectively.

To move an object 34 off the rack 18, the storage and retrieval machine 46 is operated to position the shuttle mechanism 66 at the appropriate location relative to the rack 18. Thereafter, the shuttle mechanism 66 is extended beneath the object 34, the carriage 58 is raised to lift the object 34 off the rack 18, and the shuttle mechanism 66 is retracted to withdraw the object 34 from the rack 18. To place an object 34 on the rack 18, the shuttle mechanism 66 is extended to the desired storage location 30 and the carriage 58 is then lowered to deposit the object 34 on the rack 18 before being retracted.

Various features and advantages of the invention are set forth in the following claims wherein it is to be understood that when a number of rollers is recited that number may include the number one.

We claim:

1. A storage and retrieval machine comprising
a carriage supported for movement in at least one of a horizontal direction and a vertical direction, and
a shuttle mechanism supported on said carriage, said shuttle mechanism including
a first plate assembly
a second plate assembly, and
a set of rollers supporting said first and second plate assemblies relative to each other, said second plate assembly being supported for extension relative to said first plate assembly in a first direction and for retraction relative to said first plate assembly in a second direction opposite said first direction, said set of rollers including a first number of large-diameter rollers each having a first diameter, and a second number of small-diameter rollers each having a second diameter less than said first diameter, each of said rollers being rotatably mounted on one of said first and second plate assemblies for rolling movement along the other of said first and second plate assemblies, and said large-diameter rollers and said small-diameter rollers being mounted for rotation about generally parallel axes.

2. A storage and retrieval machine as set forth in claim 1 wherein all of said large-diameter rollers and said small-diameter rollers are supported for rolling movement on a common plane.

3. A storage and retrieval machine as set forth in claim 1 wherein said set of rollers supporting said first and second plate assemblies relative to each other includes more of said small-diameter rollers than said large-diameter rollers.

4. A storage and retrieval machine as set forth in claim 3 wherein at least four of said small-diameter rollers are aligned in a plane perpendicular to said first direction.

5. A storage and retrieval machine as set forth in claim 3 wherein said set of rollers supporting said first and second plate assemblies relative to each other includes twice as many of said small-diameter rollers as said large-diameter rollers.

6. A storage and retrieval machine as set forth in claim 3 wherein said first number is greater than one, at least two of said large-diameter rollers being coaxially aligned, and at least four of said small-diameter rollers being coaxially aligned.

7. A storage and retrieval machine as set forth in claim 3 wherein each of said small-diameter rollers is spaced from each of said large-diameter rollers in said first direction.

8. A storage and retrieval machine as set forth in claim 1 wherein one of said first and second plate assemblies includes a roller guide having a generally planar support surface, each of said rollers being rotatably mounted on the other of said first and second plate assemblies and being supported on said support surface for rolling movement.

9. A storage and retrieval machine as set forth in claim 1 wherein said shuttle mechanism includes a plurality of successive plate assemblies, said successive plate assemblies including said first and second plate assemblies, each of said plate assemblies being extendable in said first direction relative to a preceding one of said plate assemblies, and wherein said shuttle mechanism also includes additional sets of rollers, every other one of said plate assemblies having thereon at least one of said sets of rollers, the remaining ones of said plate assemblies including respective roller guides, each of said roller guides having a generally horizontal support surface, and wherein each one of said additional sets of rollers includes a large-diameter roller having a diameter, and a pair of small-diameter rollers each having a diameter less than said diameter of said large-diameter roller in said one additional set of rollers, said large-diameter roller and said pair of small-diameter rollers in each of said additional sets of rollers being spaced from one another in said first direction and rolling along the same one of said generally horizontal support surfaces.

10. A storage and retrieval machine as set forth in claim 1 wherein said second plate assembly extends and retracts along an axis and through a range of movement, wherein one of said first and second plate assemblies includes a roller guide having a generally vertical surface, a generally horizontal, upwardly facing lower support surface extending in one direction from said vertical surface, and a generally horizontal, downwardly facing upper support surface which is opposite said lower support surface and which extends in said one direction from said vertical surface, said upper and lower surfaces having respective widths perpendicular to said axis, said width of one of said upper and lower surfaces being approximately twice said width of the other of said upper and lower surfaces, wherein the other of said first and second plate assemblies has said rollers rotatably mounted thereon, wherein two of said small-diameter rollers are coaxial and roll along said one of said upper and lower surfaces during at least a portion of said range of movement, and wherein one of said large-diameter rollers rolls along the other of said upper and lower surfaces during at least portion of said range of movement.

11. A storage and retrieval machine as set forth in claim 1 wherein all of said rollers are rotably mounted on one of said first and second plate assemblies.

12. A storage and retrieval machine as set forth in Claim 1 wherein said second plate assembly extends and retracts along an axis and through a range of movement, wherein one of said first and second plate assemblies includes a roller guide having a generally vertical surface, a generally horizontal, upwardly facing lower support surface extending in one direction from said vertical surface, and a generally horizontal, downwardly facing upper support surface which is opposite said lower support surface and which extends in said one direction from said vertical surface, said upper and lower surfaces having respective widths perpendicular to said axis, said width of one of said upper and lower surfaces being approximately twice said width of the other of said upper and lower surfaces, wherein the other of said first and second plate assemblies has said rollers rotatably mounted thereon, and wherein the rollers supporting said first and second plate assemblies relative to each other include a first group of only four of said small-diameter rollers which are coaxially aligned in a first plane perpendicular to said first direction and which roll along said one of said upper and lower surfaces during at least a portion of said range of movement, a second group of only four of said small-diameter rollers which are coaxially aligned in a second plane perpendicular to said first direction and which roll along said one of said upper and lower surfaces during at least a portion of said range of movement, a first group of only two of said large-diameter rollers which are coaxially aligned in a third plane perpendicular to said first direction and which roll along said one of said upper and lower surfaces during at least a portion of said range of movement and along the other of said upper and lower surfaces during at least a portion of said range of movement, and a second group of only two of said large-diameter rollers which are coaxially aligned in a fourth plane perpendicular to said first direction and which roll along said one of said upper and lower surfaces during at least a portion of said range of movement and along the other of said upper and lower surfaces during at least a portion of said range of movement.

13. A storage and retrieval machine comprising
a carriage supported for movement in at least one of a horizontal direction and a vertical direction,
a shuttle mechanism supported on said carriage, said shuttle mechanism including
a first plate assembly,
a second plate assembly, and
a set of rollers supporting said first and second plate assemblies relative to each other, said second plate assembly being supported for extension relative to said first plate assembly in a first direction and for retraction relative to said first plate assembly in a second direction opposite said first direction, said set of rollers including a first number of first rollers aligned in a first plane perpendicular to said first direction, and a second number of second rollers aligned in a second plane perpendicular to said first direction, said first and second planes being spaced apart in said first direction, said second number being greater than said first number such that more of said rollers supporting said first and second plate assemblies relative to each other are located in said second plane than in said first plane, and all of said rollers being rotatably mounted on one of said plate assemblies and rolling along the other of said plate assemblies.

14. A storage and retrieval machine as set forth in claim 13 wherein said first number is greater than one, at least two of said first rollers being coaxially aligned, and at least four of said second rollers being coaxially aligned.

15. A storage and retrieval machine as set forth in claim 13 wherein all of said first and second rollers are supported for rolling movement along a common plane.

16. A storage and retrieval machine as set forth in claim 13 wherein said set of rollers supporting said first and second plate assemblies relative to each other includes twice as many rollers in said second plane as in said first plane 17. A storage and retrieval machine as set forth in claim 13 wherein said second plate assembly extends and retracts along an axis and through a range of movement, wherein said other of said first and second plate assemblies includes a roller guide having a generally vertical surface, a generally horizontal, upwardly facing lower support surface extending in one direction from said vertical surface, and a generally horizontal, downwardly facing upper support surface which is opposite said lower support surface and which extends in said one direction from said vertical surface, said upper and lower surfaces having respective widths perpendicular to said axis, said width of one of said upper and lower surfaces being approximately twice said width of the other of said upper and lower surfaces, wherein two of said second rollers are coaxial and roll along said one of said upper and lower surfaces during at least a portion of said range of movement, and wherein one of said first rollers rolls along the other of said upper and lower surfaces during at least portion of said range of movement.

18. A storage and retrieval machine as set forth in claim 13 wherein each of said first rollers has a first diameter, and each of said second rollers has a second diameter less than said first diameter.

19. A storage and retrieval machine as set forth in claim 13 wherein said second plate assembly extends and retracts through a range of movement, wherein said other of said first and second plate assemblies includes a roller guide having a generally vertical surface, a generally horizontal, upwardly facing lower support surface extending in one direction from said vertical surface, and a generally horizontal, downwardly facing upper support surface which is opposite said lower support surface and which extends in said one direction from said vertical surface, said upper and lower surfaces having respective widths perpendicular to said axis, said width of one of said upper and lower surfaces being approximately twice said width of the other of said upper and lower surfaces, and wherein the rollers supporting said first and second plate assemblies relative to each other include a first group of only four of said second rollers which are coaxially aligned in said second plane and which roll along said one of said upper and lower surfaces during at least a portion of said range of movement, a second group of only four of said second rollers which are coaxially aligned in a third plane perpendicular to said first direction and which roll along said one of said upper and lower surfaces during at least a portion of said range of movement, a first group of only two of said first rollers which are coaxially aligned in said first plane and which roll along said one of said upper and lower surfaces during at least a portion of said range of movement and along the other of said upper and lower surfaces during at least a portion of said range of movement, and a second group of only two of said first rollers which are coaxially aligned in a fourth plane perpendicular to said first direction and which roll along said one of said upper and lower surfaces during at least a portion of said range of movement and along the other of said upper and lower surfaces during at least a portion of said range of movement.

20. A storage and retrieval machine comprising
a carriage supported for movement in at least one of a horizontal direction and a vertical direction, and
a shuttle mechanism supported on said carriage, said shuttle mechanism including
a first plate assembly, and
a second plate assembly supported for extension and retraction through a range of movement and along an axis relative to said first plate assembly,
one of said first and second plate assemblies including a roller guide having a generally vertical surface, a generally horizontal, upwardly facing lower support surface extending in a direction from said vertical surface, and a generally horizontal, downwardly facing upper support surface which is opposite said lower support surface, said upper and lower surfaces having respective widths perpendicular to said axis, said width of one of said upper and lower surfaces being approximately twice said width of the other of said upper and lower surfaces, and the other of said first and second plate assemblies having rotatably mounted thereon a first roller which rolls along said upper surface during at least a portion of said range of movement, a second roller which is spaced from said first roller along said axis and which rolls along said lower surface during at least a portion of said range of movement, and a third roller which is coaxial with one of said first and second rollers and which rolls along said one of said upper and lower surfaces during at least a portion of said range of movement.

21. A storage and retrieval machine as set forth in claim 20 wherein said third roller is coaxial with said first roller and rolls along said upper surface during at least a portion of said range of movement, and wherein said width of said upper surface is approximately twice said width of said lower surface.

22. A storage and retrieval machine as set forth in claim 20 wherein said third roller is coaxial with said second roller and rolls along said lower surface during at least a portion of said range of movement, and wherein said width of said lower surface is approximately twice said width of said upper surface.

23. A storage and retrieval machine comprising a carriage supported for movement in at least one of a horizontal direction and a vertical direction, and a shuttle mechanism supported on said carriage, said shuttle mechanism including a first plate assembly a second plate assembly, one of said first and second plate assemblies including a generally planar roller guide surface, and a set of rollers supporting said first and second plate assemblies relative to each other, said second plate assembly being supported for extension relative to said first plate assembly in a first direction and for retraction relative to said first plate assembly in a second direction opposite said first direction, said set of rollers including a first number of large-diameter rollers each having a first diameter, and a second number of small-diameter rollers each having a second diameter less than said first diameter, said large-diameter rollers and said small-diameter rollers being rotatably mounted on the other of said first and second plate assemblies for rolling movement along said roller guide surface.

24. A storage and retrieval machine as set forth in claim 23 wherein said set of rollers supporting said first and second plate assemblies relative to each other includes more of said small-diameter rollers than said large-diameter rollers.

25. A storage and retrieval machine as set forth in claim 24 wherein at least four of said small-diameter rollers are aligned in a plane perpendicular to said first direction.

26. A storage and retrieval machine as set forth in claim 24 wherein said set of rollers supporting said first and second plate assemblies relative to each other includes twice as many of said small-diameter rollers as said large-diameter rollers.

27. A storage and retrieval machine as set forth in claim 24 wherein said first number is greater than one, at least two of said large-diameter rollers being coaxially aligned, and at least four of said small-diameter rollers being coaxially aligned.

28. A storage and retrieval machine as set forth in claim 23 wherein said shuttle mechanism includes a plurality of successive plate assemblies, said successive plate assemblies including said first and second plate assemblies, each of said plate assemblies being extendable in said first direction relative to a preceding one of said plate assemblies, and wherein said shuttle mechanism also includes additional sets of rollers, every other one of said plate assemblies having thereon at least one of said sets of rollers, the remaining ones of said plate assemblies including respective roller guides, each of said roller guides having a generally horizontal support surface, and wherein each one of said additional sets of rollers includes a large-diameter roller having a diameter, and a pair of small-diameter rollers each having a diameter less than said diameter of said large-diameter roller in said one additional set of rollers, said large-diameter and said pair of small-diameter rollers in each of said additional sets of rollers being spaced from one another in said first direction and rolling along the same one of said generally horizontal support surfaces.

29. A storage and retrieval machine as set forth in claim 23 wherein said second plate assembly extends and retracts along an axis and through a range of movement, wherein one of said first and second plate assemblies includes a roller guide having a generally vertical surface, a generally horizontal, upwardly facing lower support surface extending in one direction from said vertical surface, and a generally horizontal, downwardly facing upper support surface which is opposite said lower support surface and which extends in said one direction from said vertical surface, said upper and lower surfaces having respective widths perpendicular to said axis, said width of one of said upper and lower surfaces being approximately twice said width of the other of said upper and lower surfaces, wherein the other of said first and second plate assemblies has said rollers rotatably mounted thereon, wherein two of said small-diameter rollers are coaxial and roll along said one of said upper and lower surfaces during at least a portion of said range of movement, and wherein one of said large-diameter rollers rolls along the other of said upper and lower surfaces during at least portion of said range of movement.

30. A storage and retrieval machine as set forth in claim 23 wherein said second plate assembly extends and retracts along an axis and through a range of movement, wherein said one of said first and second plate assemblies includes a roller guide having a generally vertical surface, a generally horizontal, upwardly facing lower support surface extending in one direction from said vertical surface, and a generally horizontal, downwardly facing upper support surface which is opposite said lower support surface and which extends in said one direction from said vertical surface, said upper and lower surfaces having respective widths perpendicular to said axis, said width of one of said upper and lower surfaces being approximately twice said width of the other of said upper and lower surfaces, and wherein the rollers supporting said first and second plate assemblies relative to each other include a first group of only four of said small-diameter rollers which are coaxially aligned in a first plane perpendicular to said first direction and which roll along said one of said upper and lower surfaces during at least a portion of said range of movement, a second group of only four of said small-diameter rollers which are coaxially aligned in a second plane perpendicular to said first direction and which roll along said one of said upper and lower surfaces during at least a portion of said range of movement, a first group of only two of said large-diameter rollers which are coaxially aligned in a third plane perpendicular to said first direction and which roll along said one of said upper and lower surfaces during at least a portion of said range of movement and along the other of said upper and lower surfaces during at least a portion of said range of movement, and a second group of only two of said large-diameter rollers which are coaxially aligned in a fourth plane perpendicular to said first direction and which roll along said one of said upper and lower surfaces during at least a portion of said range of movement and along the other of said upper and lower surfaces during at least a portion of said range of movement.

* * * * *